United States Patent [19]

Krom

[11] Patent Number: 5,166,861
[45] Date of Patent: Nov. 24, 1992

[54] CIRCUIT BREAKER SWITCHBOARD

[75] Inventor: Thomas J. Krom, Lebanon, Tenn.

[73] Assignee: Square D Company, Palatine, Ill.

[21] Appl. No.: 732,391

[22] Filed: Jul. 18, 1991

[51] Int. Cl.⁵ .............................................. H05K 7/20
[52] U.S. Cl. .................................. 361/379; 174/16.2; 361/361
[58] Field of Search .................... 98/46, 70–72 B; 174/16.1, 16.2; 200/289; 165/80.3; 361/346, 353, 355, 356, 358, 361, 363, 429, 382, 383, 379; 439/485

[56] References Cited

U.S. PATENT DOCUMENTS

| | | | |
|---|---|---|---|
| 3,621,339 | 11/1971 | Hodgson | 174/16.2 |
| 4,142,225 | 2/1979 | Diersing | 361/361 |
| 4,178,624 | 12/1979 | Wilson | 361/361 |
| 4,358,815 | 11/1982 | Koslosky | 361/355 |
| 4,366,528 | 12/1982 | Cole | 361/361 |
| 4,528,614 | 7/1985 | Shariff | 361/379 |
| 5,008,493 | 4/1991 | Wegener | 361/355 |
| 5,068,491 | 11/1991 | Ogata et al. | 174/16.2 |

FOREIGN PATENT DOCUMENTS 2276715 2/1976 France .............................. 174/16.2

Primary Examiner—Gerald P. Tolin
Attorney, Agent, or Firm—David Russell Stacey; Robert E. Pitts

[57] ABSTRACT

A switchboard for mounting and supplying electrical power to a plurality of circuit breakers. The switchboard comprises a frame including a center mounting pan, and at least first and second circuit breaker mounting pans for engaging and supporting the rear end portions of the circuit breakers. The switchboard also comprises a power stack assembly mounted on the center mounting pan of the frame. The power stack assembly includes first, second and third, substantially vertically disposed main bus bar members for being connected to a source of electrical power and for releasably engaging the circuit breakers. The first main bus bar member is selectively spaced from the center mounting pan with insulator members so as to define a first ventilation passageway therebetween. The second main bus bar member is selectively spaced from the first main bus bar member with insulator members so as to define a second ventilation passageway therebetween. The third main bus bar member is selectively spaced from the second main bus bar member with insulator members so as to define a third ventilation passageway therebetween. The power stack assembly further including a channel vent cover selectively spaced from the third main bus member with insulating members so as to define a fourth ventilation passageway therebetween. Further, in the preferred embodiment the center mounting pan and the main bus bars are provided with ventilation openings along their lengths to further facilitate air flow through the power stack assembly.

18 Claims, 14 Drawing Sheets

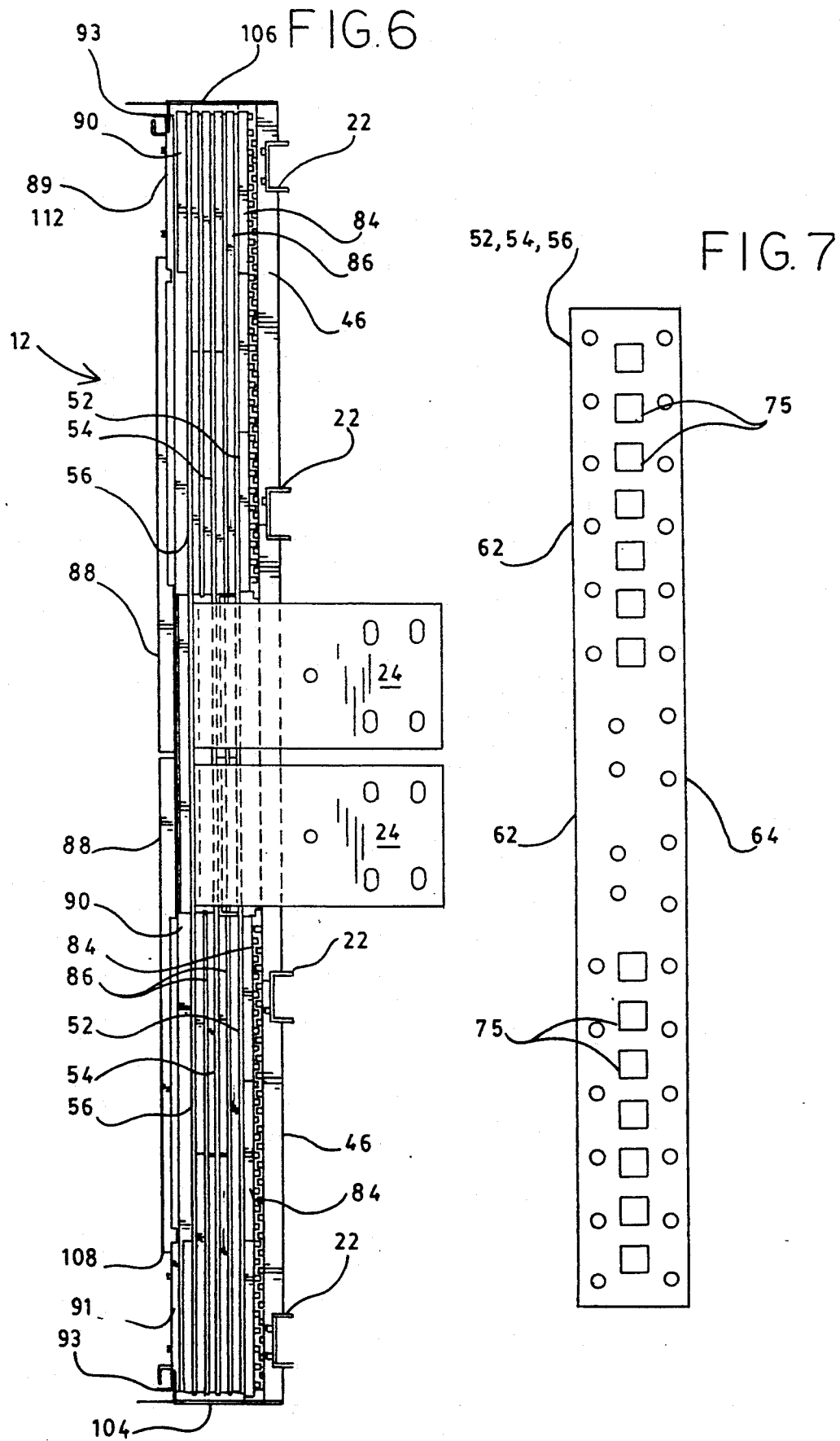

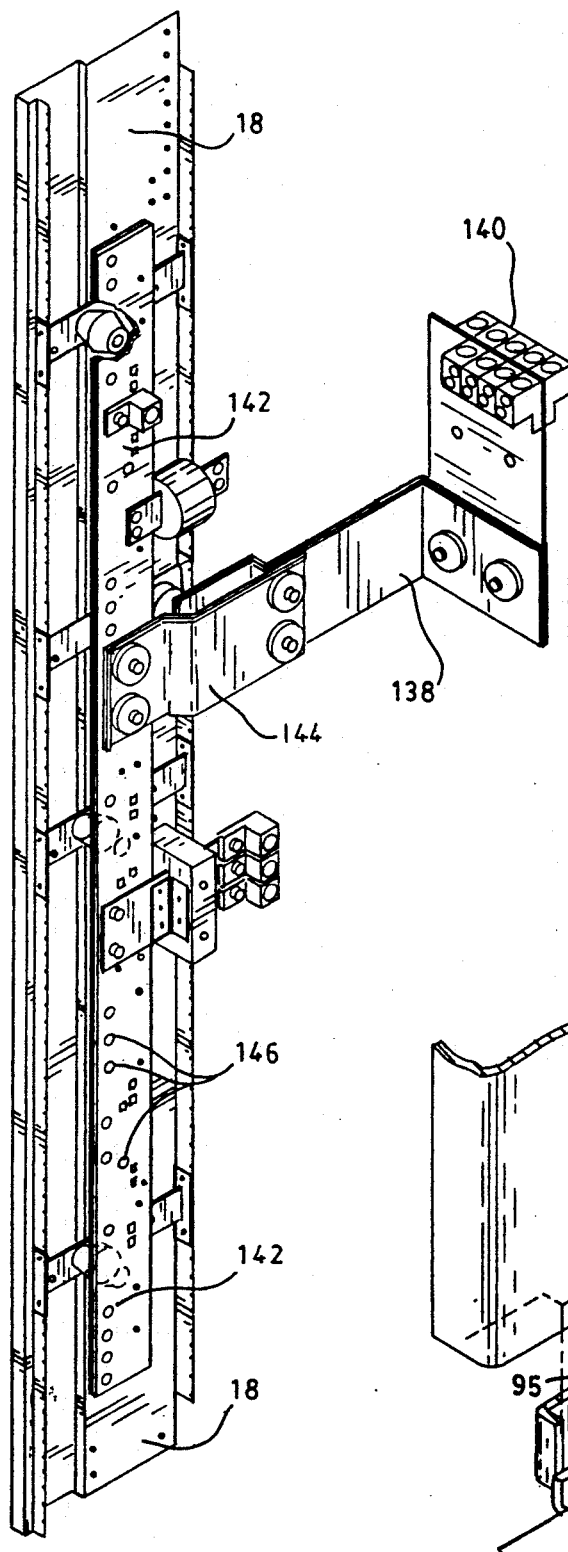
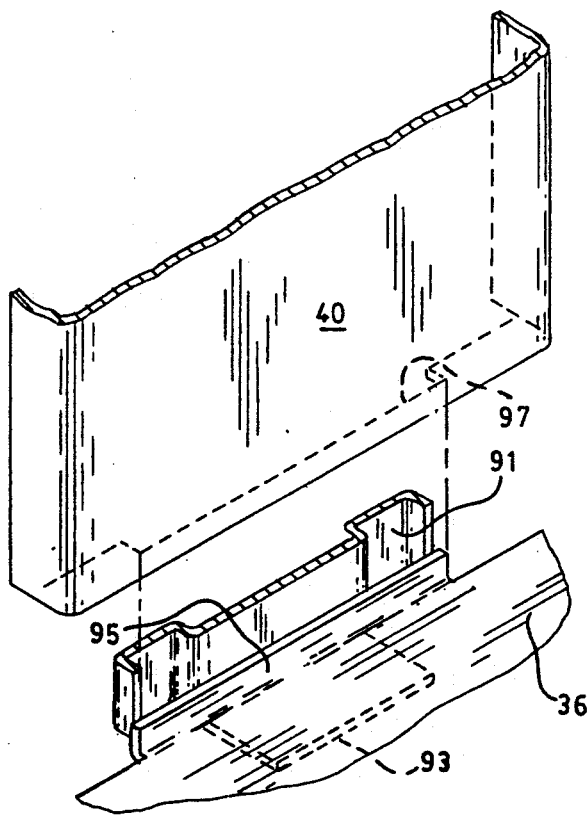
FIG. 16
FIG. 19

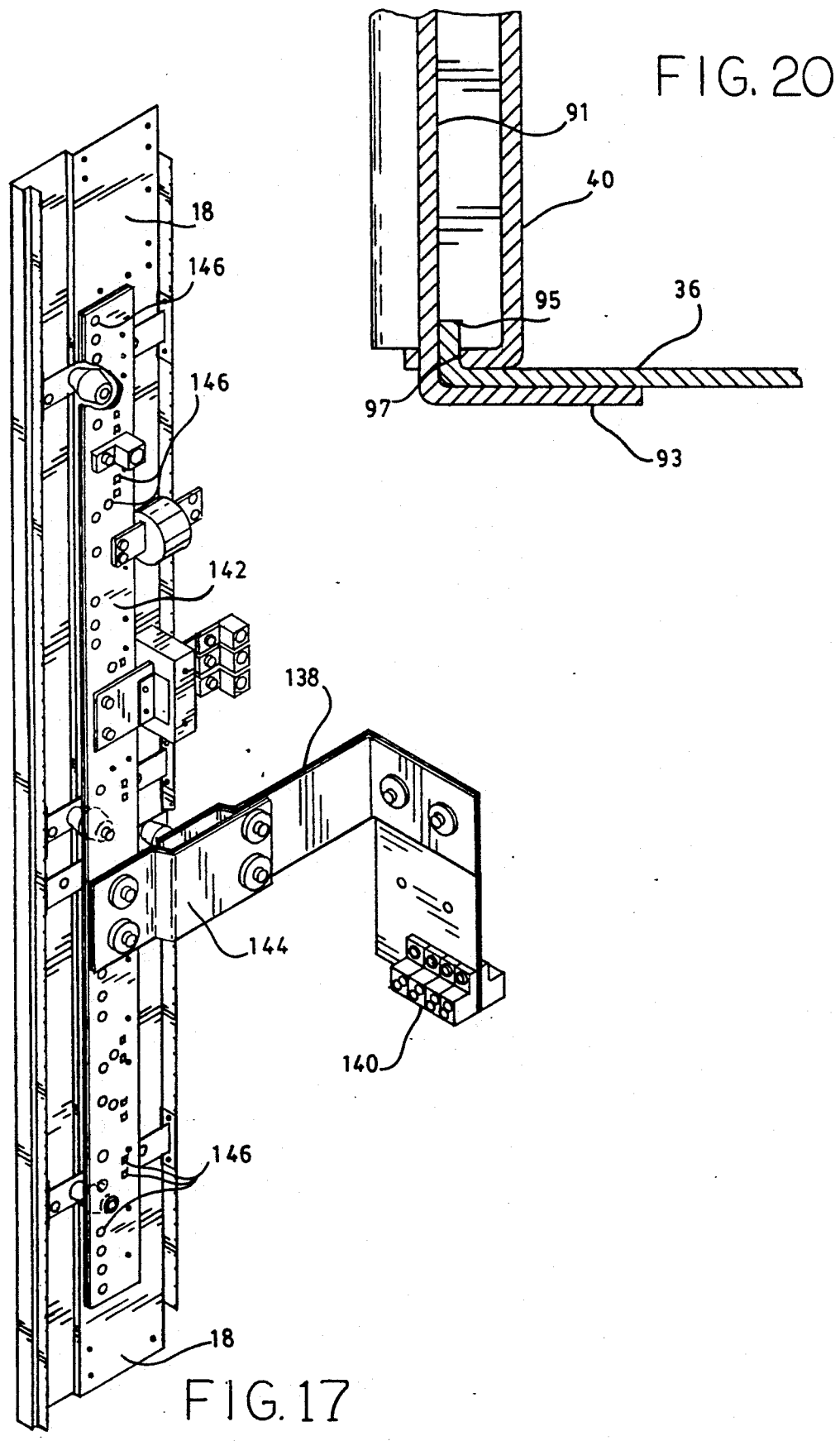

CIRCUIT BREAKER SWITCHBOARD

TECHNICAL FIELD

This invention relates to an improved switchboard for mounting, and supplying electrical power to, a plurality of circuit breakers. In this particular invention the switchboard includes a power stack assembly defining a plurality of ventilation passageways to facilitate cooling of the power stack and the breakers mounted thereon.

BACKGROUND ART

Switchboards for mounting and supplying electrical power to a plurality of circuit breakers are well known in the art. However, the total amperage which can be handled by a switchboard is limited due to heat radiated by the breakers. In this regard, attempts in the 1970's to develop a 3,000 ampere alternating current switchboard failed due to excessive heat within the circuit breakers. More specifically, the failure was in meeting the specified Underwriters Laboratories temperature limits on the circuit breaker load cables, or at the line side plug-on connectors. Moreover, heretofore access to the various lug assemblies of conventional switchboards has been restrictive, making cable connections and other wiring tasks difficult and time consuming.

Therefore, it is an object of the present invention to provide a switchboard which provides for cooler circuit breaker operation, such that a longer power stack can be used and more and larger circuit breakers can be mounted in a single switchboard.

It is another object of the present invention to provide a switchboard which affords ready access to the neutral bus bar assembly, the ground bus lug mounting assembly, and the other components of the switchboard.

Yet another object of the present invention is to provide a switchboard which is inexpensive to manufacture and maintain.

DISCLOSURE OF THE INVENTION

Other objects and advantages will be accomplished by the present invention which provides a switchboard for mounting, and supplying electrical power to, a plurality of circuit breakers. The switchboard comprises a frame including a center mounting pan, and including at least first and second circuit breaker mounting pans for engaging and supporting the rear end portions of the circuit breakers. The first circuit breaker mounting pan is selectively spaced from the center mounting pan so as to define an open area therebetween, and the second circuit breaker mounting pan is oppositely disposed with respect to the first circuit breaker mounting pan relative to the center mounting pan and is selectively spaced from the center mounting pan so as to define an open area therebetween. The switchboard also comprises a power stack assembly mounted on the center mounting pan of the frame. The power stack assembly includes first, second and third, substantially vertical, elongated main bus bar members for being connected to a source of electrical power and for releasably engaging the circuit breakers. The first main bus bar member is selectively spaced from the center mounting pan with insulator members so as to define a first ventilation passageway therebetween. The second main bus bar member is selectively spaced from the first main bus bar member with insulator members so as to define a second ventilation passageway therebetween. Similarly, the third main bus bar member is selectively spaced from the second main bus bar member with insulator members so as to define a third ventilation passageway therebetween. The power stack assembly further including a channel vent cover selectively spaced from the third main bus bar member with insulating members so as to define a forth ventilation passageway therebetween. Each of the first, second and third ventilation passageways defines an opening at the lower end of the power stack assembly and an opening at the upper end of the power stack assembly. The forth ventilation passageway defines an opening proximate the lower end of the channel vent cover and an opening proximate the upper end of the channel vent cover. Resultantly, convection air is allowed to rise within the ventilation passageways to cool the power stack assembly. Further, in the preferred embodiment the center mounting pan and the main bus bars are provided with ventilation openings along their lengths to further facilitate air flow through the power stack assembly.

BRIEF DESCRIPTION OF THE DRAWINGS

The above mentioned features of the invention will be more clearly understood from the following detailed description of the invention read together with the drawings in which:

FIG. 6 illustrates a side elevation view of a portion of the frame and power stack assembly of the switchboard of the present invention.

FIG. 7 illustrates a front view of a main bus bar of the power stack assembly of the switchboard of the present invention.

FIG. 16 illustrates a perspective view of the neutral bus bar of the switchboard of the present invention.

FIG. 17 illustrates a perspective view of the neutral bus bar of the switchboard of the present invention.

FIG. 19 illustrates a perspective view of a portion of the enclosure of the switchboard of the present invention.

FIG. 20 illustrates a side elevation view of a portion of the enclosure of the switchboard of the present invention.

BEST MODE FOR CARRYING OUT THE INVENTION

Figure 1:
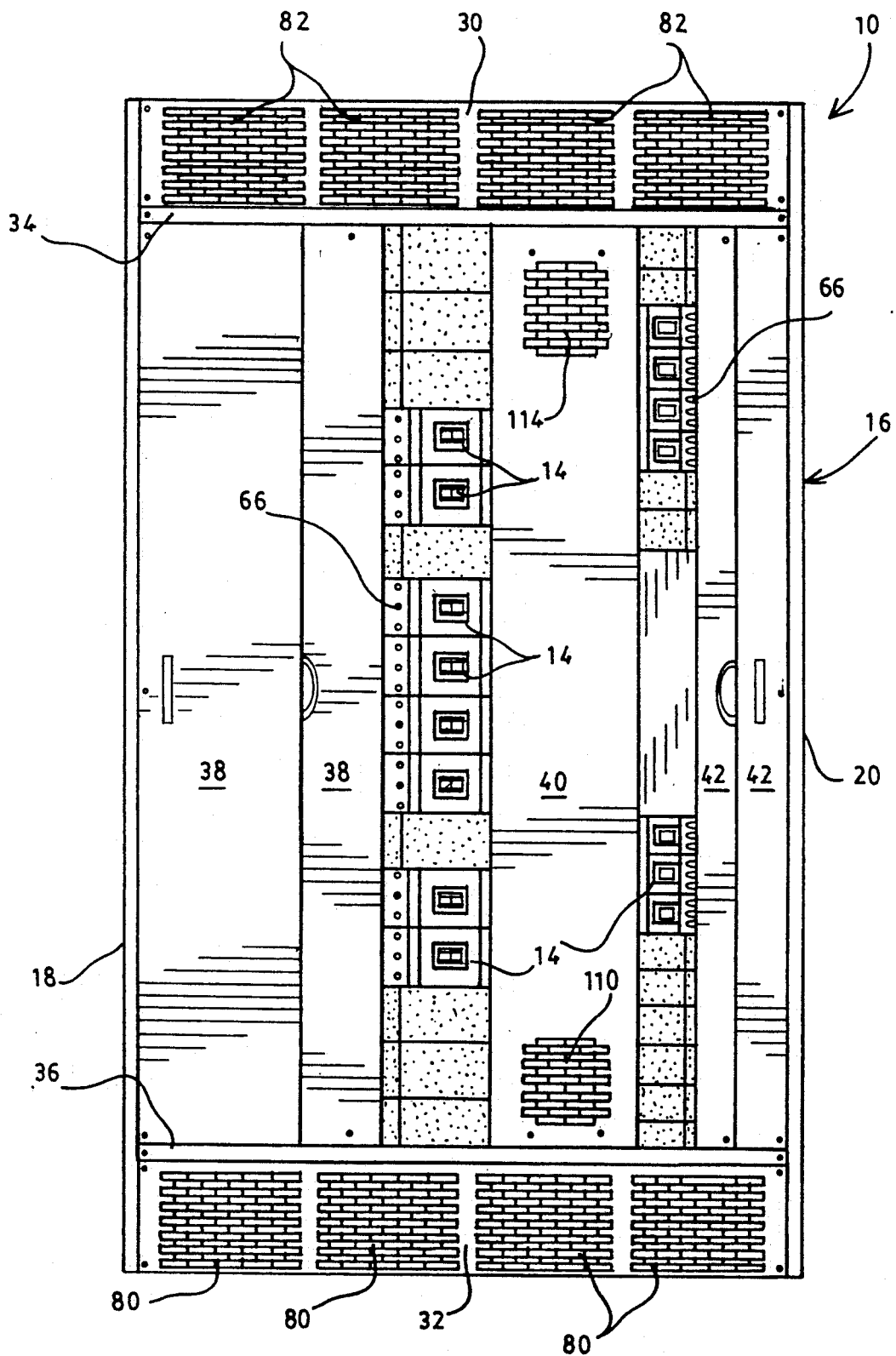
FIG. 1 illustrates a front view of a switchboard of the present invention.

A switchboard incorporating various features of the present invention is illustrated at 10 in FIG. 1. The switchboard 10 includes a substantially vertical power stack assembly 12 (See FIGS. 5 and 6) which accommodates the installation and electrical connection of a plurality of circuit breakers 14. As discussed in detail below the construction of the power stack assembly 12 and the use of a multi-pan mounting assembly for mounting the power stack assembly and circuit breakers provides for cooler circuit breaker operation.

Figure 3:
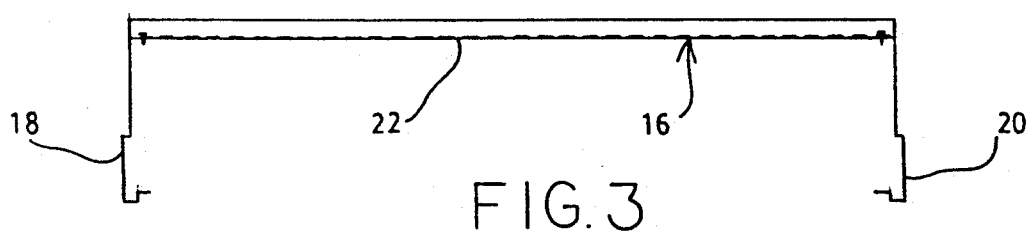
FIG. 3 illustrates a top view of a portion of the frame of the switchboard of the present invention.
Figure 4:
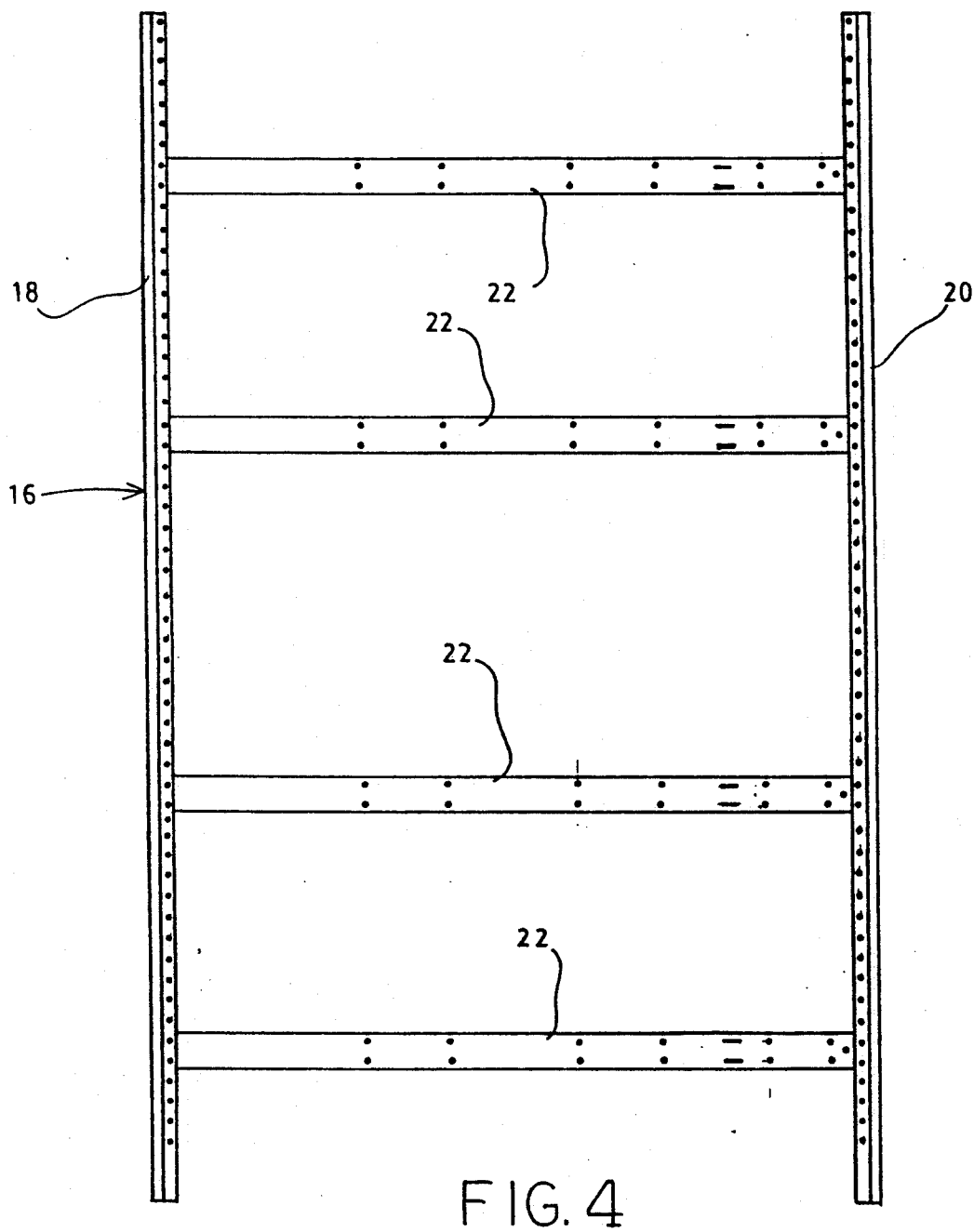
FIG. 4 illustrates a front view of a portion of the frame of the switchboard of the present invention.
Figure 14:
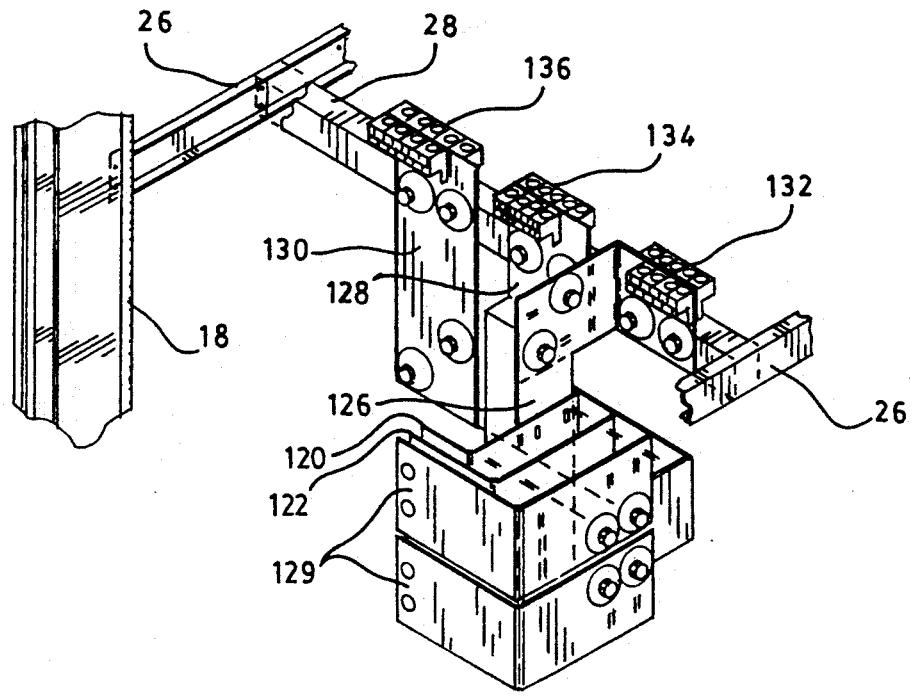
FIG. 14 illustrates a perspective view of the main lug connection assembly of the switchboard of the present invention.
Figure 15:
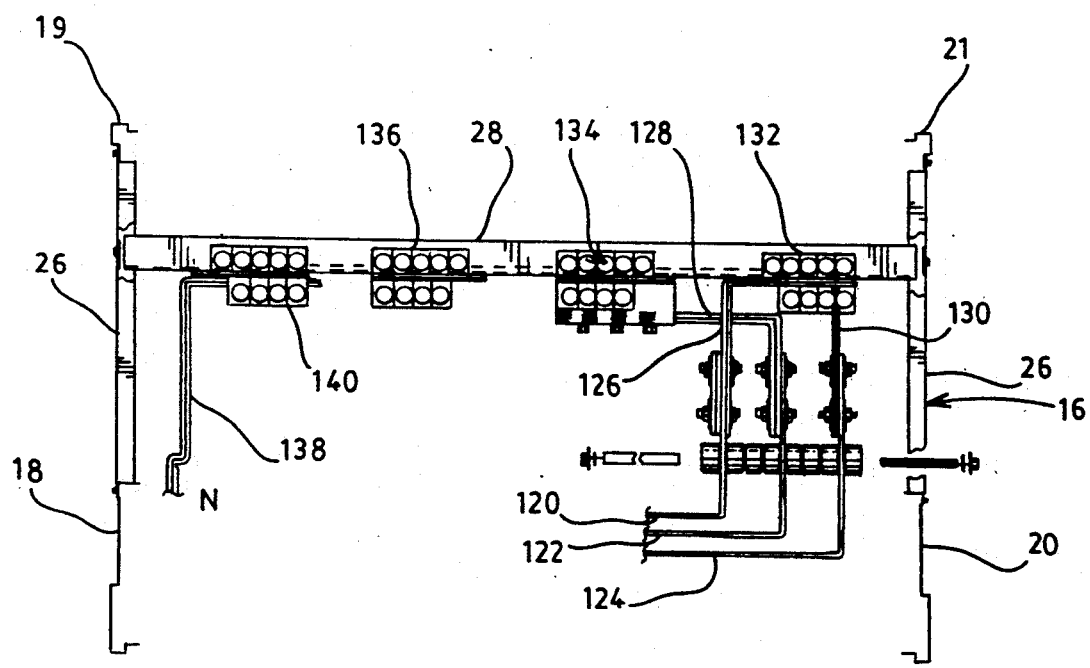
FIG. 15 illustrates a top view of the main lug connection assembly of the switchboard of the present invention.

More specifically, in the preferred illustrated embodiment the switchboard 10 includes a support frame 16 (See FIGS. 3 and 4) having first and second vertical support channels 18 and 20, respectively. The first and second vertical support channels 18 and 20 are secured at their rearward edge portions to the opposite ends of a plurality of substantially horizontally disposed mounting channels 22. As will be discussed below, the frame 16 also includes a plurality of channel side supports 26 which extend rearwardly from the vertical support members 18 and 20 to engage rear vertical supports 19 and 21. (See FIG. 15) Further, the opposite ends of one or more horizontally disposed bus support channels 28 engage and extend between the side supports 26. (See FIGS. 14 and 15).

Figure 2:
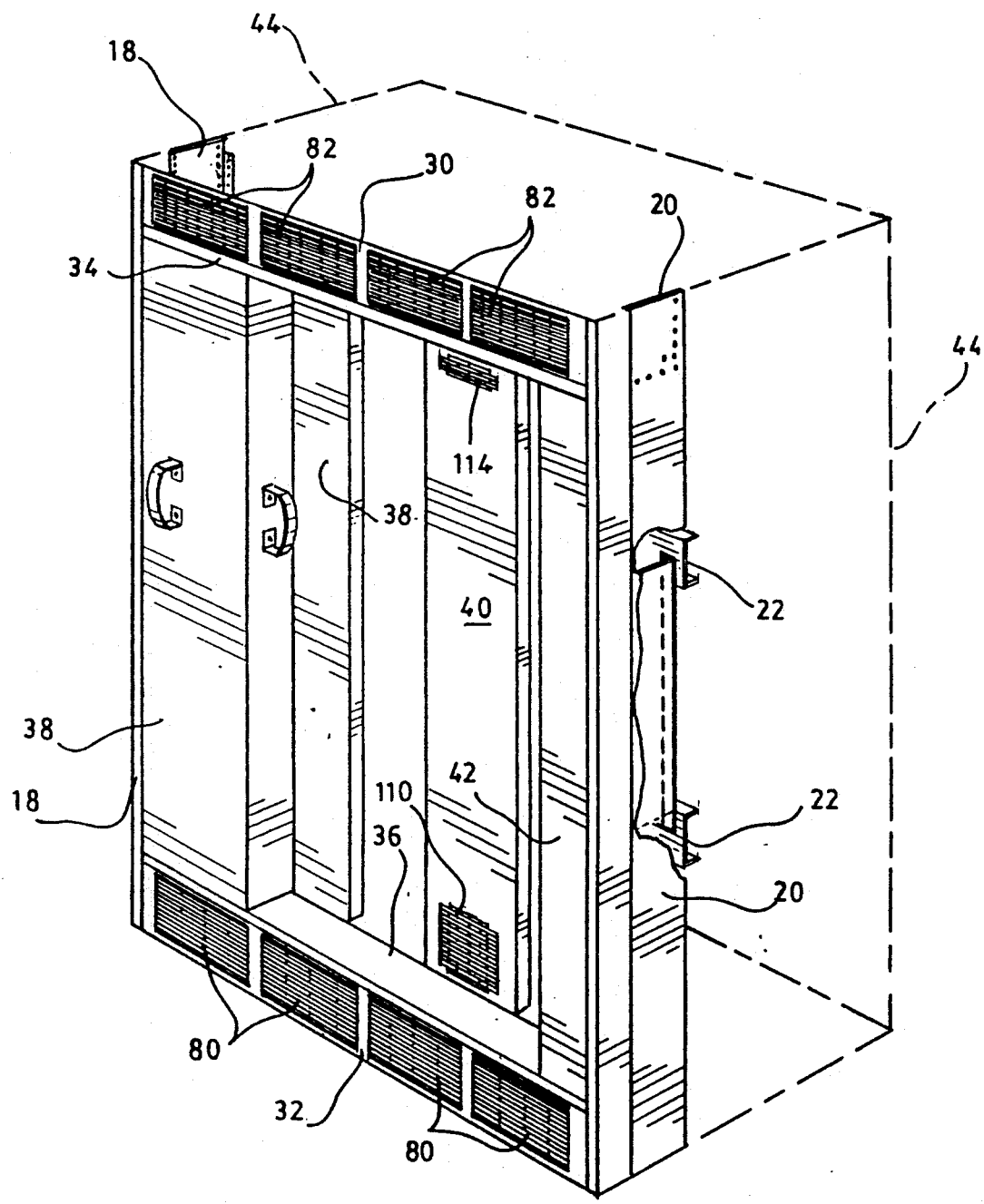
FIG. 2 illustrates a partial perspective view of the switchboard of the present invention.

As illustrated in FIGS. 1 and 2 the switchboard 10 is provided with a front assembly, including, in the preferred embodiment, upper and lower vented covers 30 and 32, respectively, and top and bottom covers 34 and 36, respectively, which are engaged to and extend between the front portions of the vertical support channels 18 and 20. Also included are removable cover panels 38, 40 and 42, which provide access to various components of the switchboard 10. Further, as illustrated by the phantom lines 44 in FIG. 2, the switchboard 10 can also be provided with a suitable enclosure for housing the frame 16 and various components of the switchboard 10. It will be recognized that the enclosure 44 can be formed by securing wall panels to the frame 16.

As indicated above, in the preferred embodiment the switchboard 10 incorporates a multi-pan mounting assembly for supporting the power stack assembly 12 and releasably mounting the circuit breakers 14. As shown in FIGS. 6, 8, 10, 11 and 13, the multi-pan mounting assembly includes a center pan 46 which supports the power stack assembly 12. The center pan 46 is secured to the mounting channels 22 of the frame 16 such that the center pan 46 is vertically disposed. Further, the center pan 46 is provided with a plurality of selectively spaced holes 48 for receiving suitable fasteners for securing the power stack assembly 12, and a plurality of ventilation openings 50 the function of which will be discussed below. (See FIG. 8).

As best illustrated in FIGS. 6, 7, 10, 11 and 13, in the preferred illustrated embodiment the power stack assembly 12 includes three vertically disposed main bus bars 52, 54 and 56 to accommodate a three phase power supply. The main bus bars 52, 54 and 56 are secured together in selectively spaced, substantially parallel alignment with insulating means being provided between the bus bars to electrically insulate the bus bars from one another. The resulting assembly 12 is secured, in selectively spaced, substantially parallel alignment, to the center pan 46, with suitable insulation means being provided between the inner bus bar 52 and the center pan 46.

Figure 5:
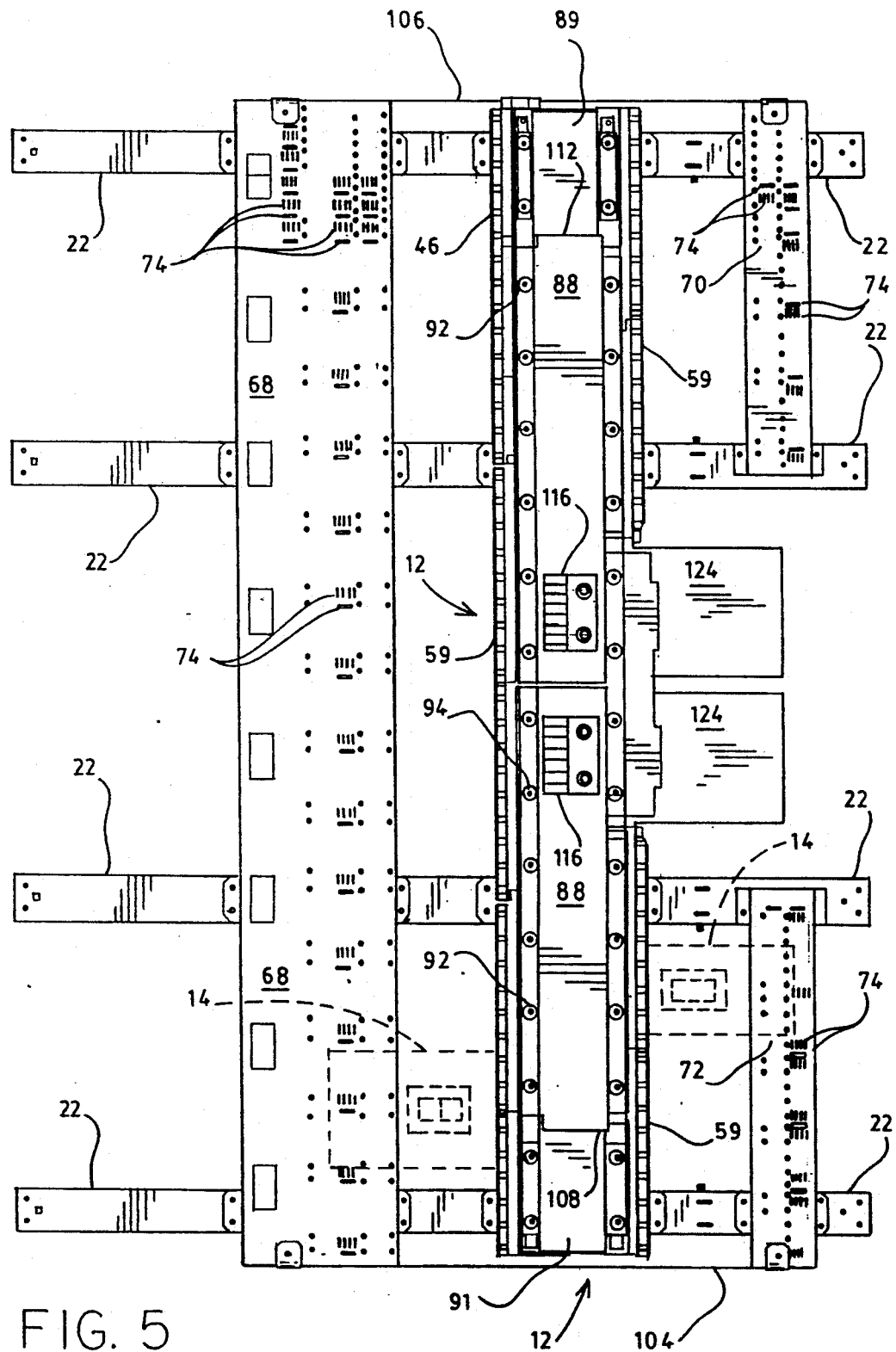
FIG. 5 illustrates a front view of a portion of the frame and power stack assembly of the switchboard of the present invention.
Figure 8:
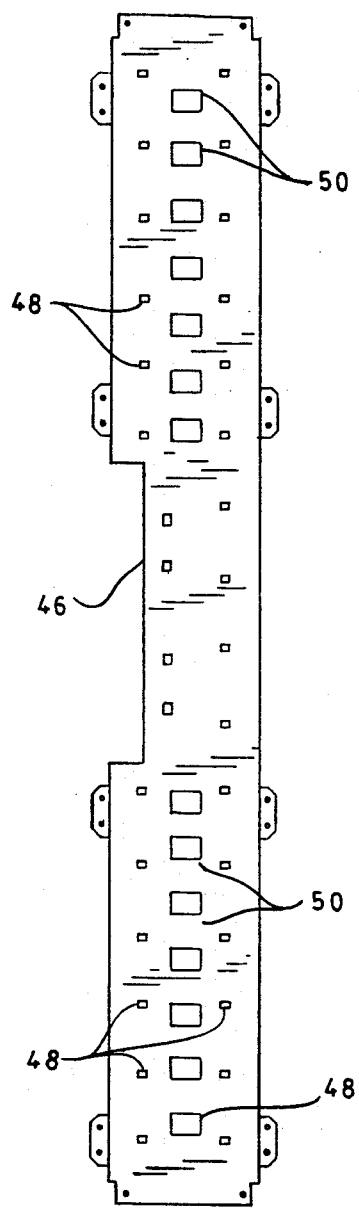
FIG. 8 illustrates a front view of the center mounting pan of the switchboard of the present invention.
Figure 9:
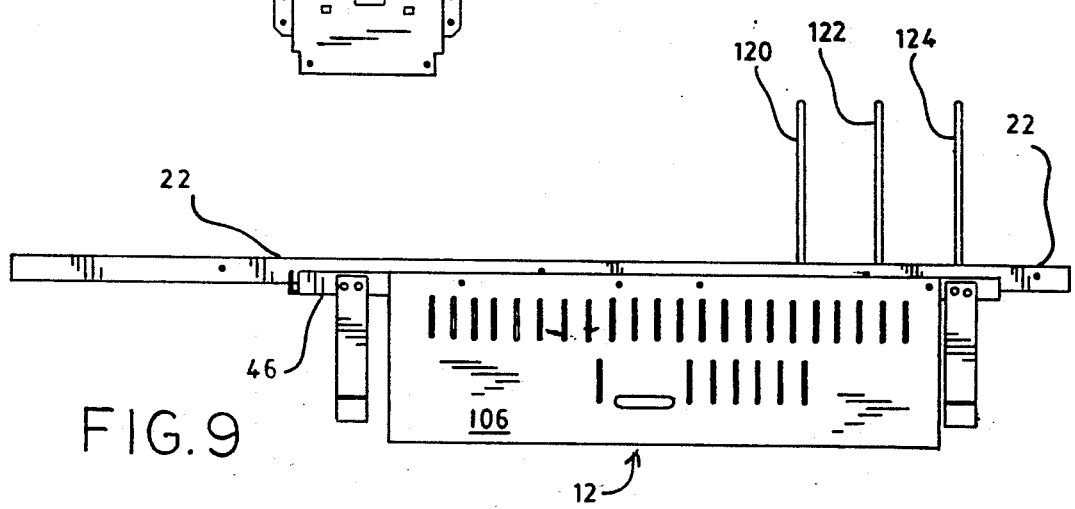
FIG. 9 illustrates a top view of a portion of the frame and power stack assembly of the switchboard of the present invention.
Figure 10:
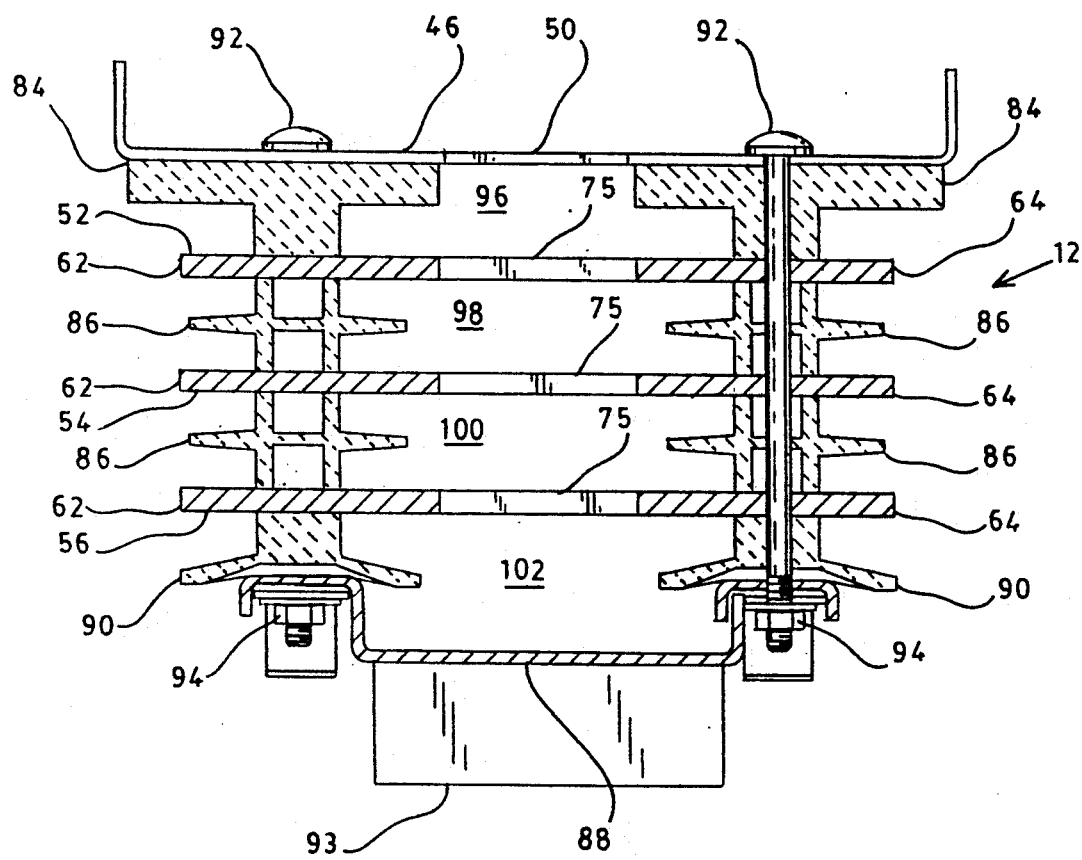
FIG. 10 illustrates a top view, in section, of the power stack assembly of the switchboard of the present invention.
Figure 12:
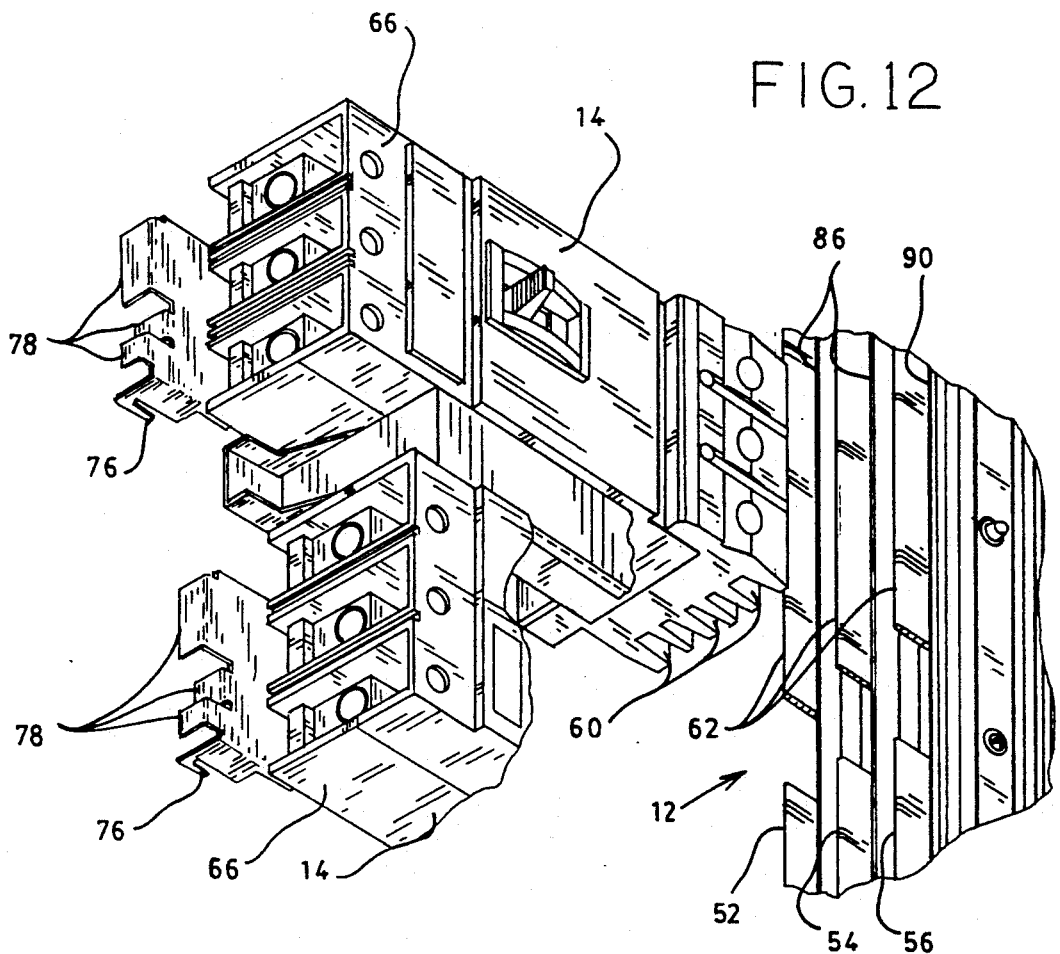
FIG. 12 illustrates a perspective view, partially in section, of a portion of the power stack assembly of the switchboard of the present invention, and circuit breakers for being installed thereon.
Figure 12A:
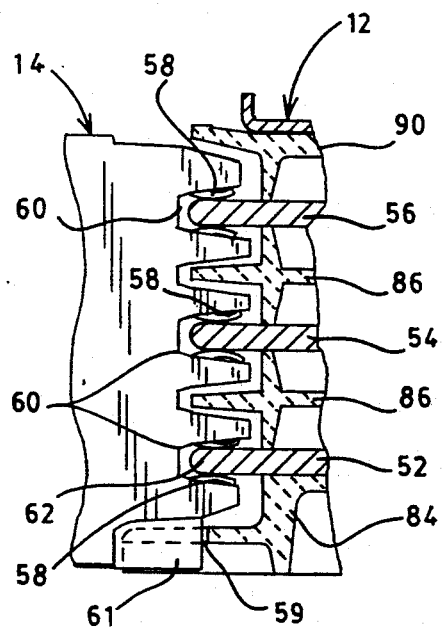
FIG. 12A illustrates a bottom view, partially in section, of a portion of the power stack assembly of the switchboard of the present invention, and circuit breakers for being installed thereon.

As illustrated in FIGS. 12 and 12A, the circuit breakers 14 are provided with electrical connecting jaws 58 mounted in slots 60 which releasably engage the outer edges 62 or 64 of the bus bars 52, 54 and 56, thereby electrically connecting the breakers 14 to the bus bars such that electrical power can be supplied to the breakers 14. Further, the inner insulators 84 are provided with mounting slots 59 which receive the mounting tabs 61 of the breakers 14 thereby supporting the line side downward weight of the breakers. It will be noted that the opposing edges 62 and 64 of the bus bars 52, 54 and 56 accommodate the mounting of breakers 14 on either side of the power stack assembly 12, as illustrated in FIG. 5.

As indicated above, the forward ends of the breakers 14 are releasably secured to the power stack assembly by the jaws 58 and tabs 61. In order to support the rearward or load end 66 of the breakers 14 and thereby maintain the installed position of the breakers 14, the multi-pan mounting assembly is provided with the mounting pans 68, 70 and 72. As illustrated in FIG. 5 the mounting pans 68, 70 and 72 are mounted on the mounting channels 22 of the frame 16 and are selectively spaced from the center pan 46 and power stack assembly 12.

Each of the mounting pans 68, 70 and 72 is provided with means for engaging the rearward ends 66 of the breakers 14. In one preferred embodiment such means includes a plurality of perforations 74 provided in the mounting pans 68, 70 and 72 which releasably receive the hook members 76 and securing tabs 78 of the breakers 14. (See FIG. 12) However, it will be appreciated that various means can be used to releasably secure the rearward ends 66 of the breakers to the mounting pans 68, 70 and 72.

With respect to the mounting pans 68, 70 and 72, it will be noted that in conventional switchboards an integral or one piece mounting pan is used to support the power stack assembly and the circuit breakers. However, use of a one piece mounting pan results in the rearward surface of the circuit breakers being positioned against, or in close proximity to, the surface of the mounting pan. This prohibits heat generated by the circuit breakers during operation from being dissipated, and results in an undesirable increase in the operating temperature of the breakers.

In the multi-pan mounting assembly of the present invention the spacing of the mounting pans 68, 70 and 72 from the center pan 46 opens up the area behind the circuit breakers 14 such that heat generated by the breakers is allowed to radiate into the rear of the enclosure 44 and away from the breakers and away from the power stack assembly. More specifically, air enters the enclosure 44 through the vents 80 provided in the lower vented cover 32, and air convection currents within the enclosure 44 are allowed to wipe across or wash over the rear surface, as well as the other outer surfaces, of circuit breakers and over the power stack assembly thereby facilitating the dissipation of heat. The resulting heated air is exhausted from the enclosure through the vents 82 provided in the upper vented cover 30. The result is a decrease in the operating temperature of the breakers 14 and the power stack assembly 12. Further, by opening up the area behind the breakers 14, radiated heat from the breakers' rear surface is allowed to transfer to other objects in the rear of the enclosure to be removed by convection currents, or to be thermo-conducted to the outside enclosure surfaces.

The use of the multiple mounting pans 46, 68, 70 and 72 also allows the mounting pans in close proximity to higher current, i.e. the pan 68 and the center pan 46, to be fabricated from an aluminum alloy, while permitting the pans 70 and 72, which are designed to support smaller circuit breakers, to be fabricated from hot rolled steel. The aluminum pans reduce heating caused by the magnetic effect, hysteresis, and provide better thermo-conduction of heat from hot-spot locations.

In the present invention the power stack assembly 12 is also configured to facilitate the dissipation of heat from the various components of the assembly in order to effect cooler operating temperatures. In this regard, in the preferred embodiment the insulating means of the assembly 12 includes two spaced rows of inner insulating members 84 which are secured between the innermost bus bar 52 and the center pan 46, and two spaced rows of intermediate insulating members 86 which are secured between bus bar 52 and the bus bar 54 and between the bus bar 54 and the outer bus bar 56. Further, a stack top channel vent cover 88 is provided to cover the outer bus bar 56, with two spaced rows of outer insulating members 90 being provided between the bus bar 56 and the cover 88. The bus bars 52, 54 and 56, and the cover 88, with the insulating members therebetween, are secured together and mounted on the center pan 46 with suitable fasteners such as the illustrated bolts 92 and nuts 94. In the preferred embodiment the bolts 92 are fabricated of hardened steel and jacketed in high dielectric strength impact resistant polycarbonate.

As a result of the selective spacing of the center pan 46, the bus bars 52, 54 and 56, and the cover 88, using spaced rows of insulating members, vertically disposed ventilation passageways 96, 98, 100 and 102 are defined which extend the length of the power stack assembly 12. (See FIG. 10) The ventilation passageways 96, 98 and 100 are open at the lower end of the power stack assembly 12 and communicate with the with the vents 80 of the lower vented cover 32 through a lower stack end barrier 104. Similarly, the passageways 96, 98 and 100 are open at the upper end of the power stack assembly 12, and communicate with the vents 82 of the upper vented cover 30 through an upper stack end barrier 106. Accordingly, convection air enters through the vents 80, flows into the passageways 96, 98 and 100, and rises through such passageways sweeping over the bus bars and center pan 46, to be exhausted through the vents 82.

Similarly, the ventilation passageway 102 is open proximate the lower end portion 108 (FIGS. 5 and 6) of the channel vent cover 88 so as to communicate with the lower vent 110 provided in the cover panel 40, and is open proximate the upper end 112 of the channel vent cover 88 so as to communicate with the upper vent 114 of the cover panel 40. Accordingly, convection air enters through the lower vent 110, flows into the passageway 102, and rises through such passageway sweeping over the bus bar 56 and the vent cover 88, to be exhausted through the upper vent 114.

In order to further facilitate the flow of convection air through the power stack assembly 12 and enhance the resulting cooling effect, air flow between the passageways 96, 98, 100 and 102 is established by ventilation openings 75 provided in the bus bars 52, 54 and 56 (See FIGS. 7 and 10) and air flow between the passageway 96 and the interior of the switchboard enclosure 44 is provided by the ventilation openings 50 provided in the center pan 46. Moreover, the channel vent cover 88 can be provided with ventilation openings 116 to provide air flow between the vent cover 88 and the cover panel 40.

Figure 13:
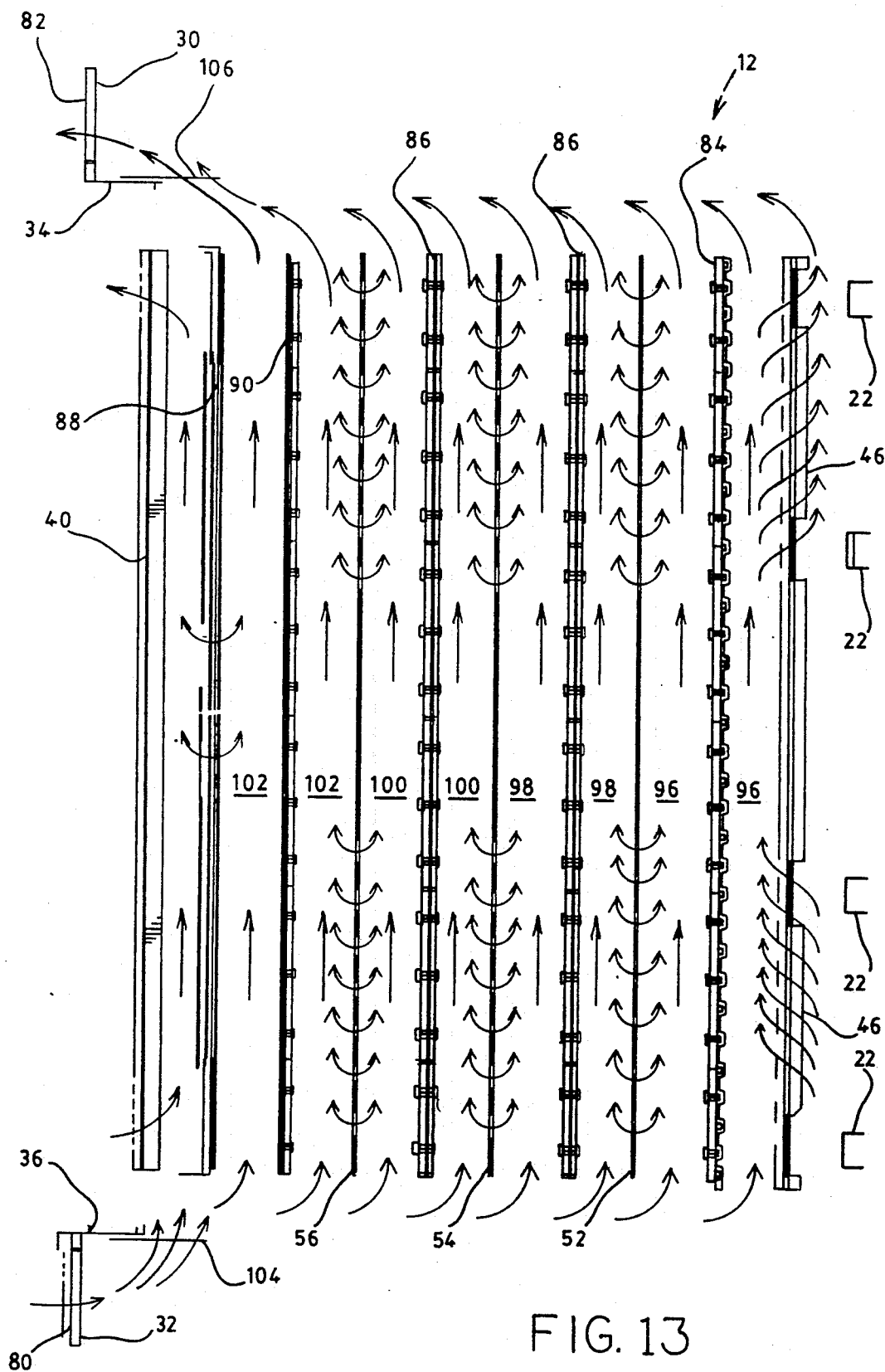
FIG. 13 illustrates an exploded side elevation view of the power stack assembly of the present invention.

The air flow through the power stack assembly 12 is diagrammatically illustrated by the arrows in FIG. 13. It will be recognized that a significant amount of radiated heat is removed from the proximity of the power stack assembly through such advantageous movement of convection air through the power stack assembly 12. The resultant decrease in operating temperature allows the power stack assembly 12 to be greater in length than conventional power stack assemblies so as to accommodate larger circuit breakers, and a greater number of circuit breakers, without excessive heat buildup.

It will be noted that in the preferred illustrated embodiment the vent cover 88 defines separate cover sections, including upper end section 89 and the lower end section 91. (See FIG. 5) As illustrated in FIGS. 19 and 20, the lower end section 91 is provided with an outwardly disposed flange 93 which extends beneath the bottom cover 36 to support the cover 36 proximate the power stack assembly 12. The bottom cover 36 is provided with an upwardly disposed flange 95 which abuts the end section 91 as best illustrated in FIG. 20. Further, the lower end of the cover panel 40 defines a notch 97 which closely receives the flange 95 when the cover panel 40 is secured over the power stack assembly 12, thereby locking the bottom cover 36 in place against the end section 91. It will be recognized that this interlocking of the bottom cover 36, the end section 91 and the cover panel 40 provides strength, and the upwardly turned flange 95 also prevents items, such as hardware, from inadvertently rolling under or into the power stack assembly.

The upper end section 89 of the vent cover 88 also defines a flange 93, and interlocks with the top cover 34 and cover panel 40 as described with respect to the lower end section 91. Further, although the end sections 89 and 91 define separate sections of the channel vent cover 88 in the illustrated embodiment, it will be understood that an integrally formed cover 88 can be used if desired.

Figure 11:
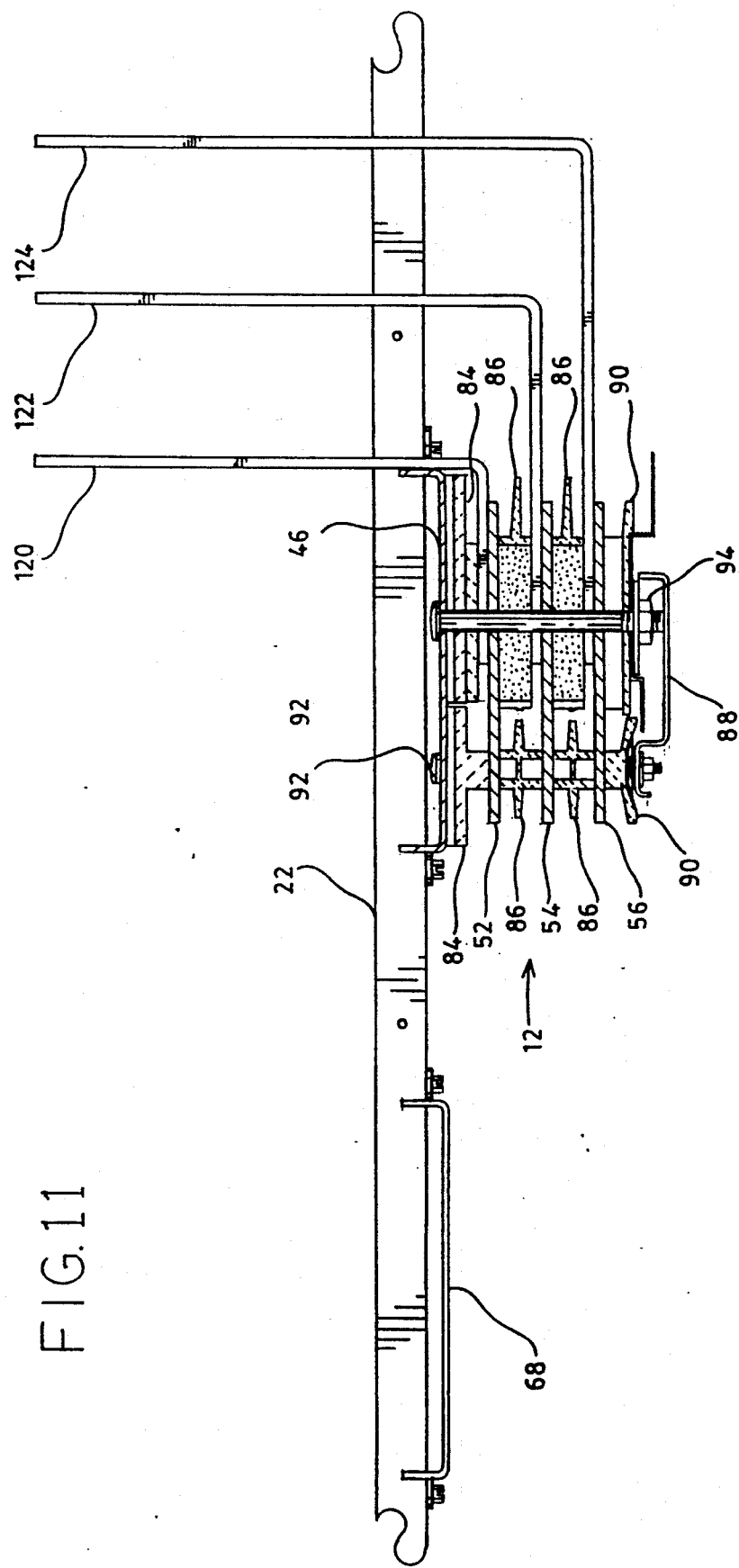
FIG. 11 illustrates a top view, in section, of the power stack assembly of the switchboard of the present invention.

The switchboard 10 is also provided with means for connecting the power stack assembly 12 to a suitable electrical power supply. Whereas various connecting means can be utilized, one suitable connecting mean comprises the main lug connection assembly illustrated in FIGS. 11, 14 and 15. The connection assembly includes the main bus connecting members 120, 122 and 124 which engage the bus bars 52, 54 and 56, respectively, as illustrated in FIG. 11. The main bus connecting members 120, 122 and 124 are electrically connected to the lug pad connectors 126, 128 and 130, respectively. The lug pad connectors 126, 128 and 130 are secured to one of the bus support channels 28 and carry the lug pads 132, 134 and 136, respectively. It will be recognized by those skilled in the art that the lug pads 132, 134 and 136 facilitate the connection of electrical cables from the electrical supply source.

It will also be noted that a neutral runback connecting member 138, carrying the neutral lug pad 140, is provided and extends from the support channel 28 toward the front of the switchboard 10. In this regard, the neutral bus bar 142 of the switchboard 10 is secured in the vertical support channel 18, as illustrated in FIGS. 16 and 17, so as to be displaced from the power stack assembly 12. The runback connecting member 138 connects to a neutral disconnect link 144 mounted on the neutral bus bar 142 to accomplish the necessary electrical connection to the lug pad 140.

It will be recognized by those skilled in the art that the neutral bus bar 142 is used on 3 phase and 4 wire systems. The vertical disposition of the neutral bus bar 142 toward the front of the switchboard makes the bar 142 readily accessible upon the removal the cover panel 38. Further, the neutral bus bar 142 defines a plurality of mounting holes 146 along its length to provided for the selective positioning of lugs, lug terminal strips, current transformers, runback connectors, etc. For example, FIGS. 16 and 17 illustrate the neutral disconnect link 144 and the neutral runback connecting member 138 in different positions, allowing variation in the position of the neutral lug pad 140. Moreover, the multiple holes 146 and the vertical disposition of the neutral bus bar 142 provides a neutral loading location adjacent the various circuit breakers, yet safely displaced from the power stack assembly.

Figure 18:
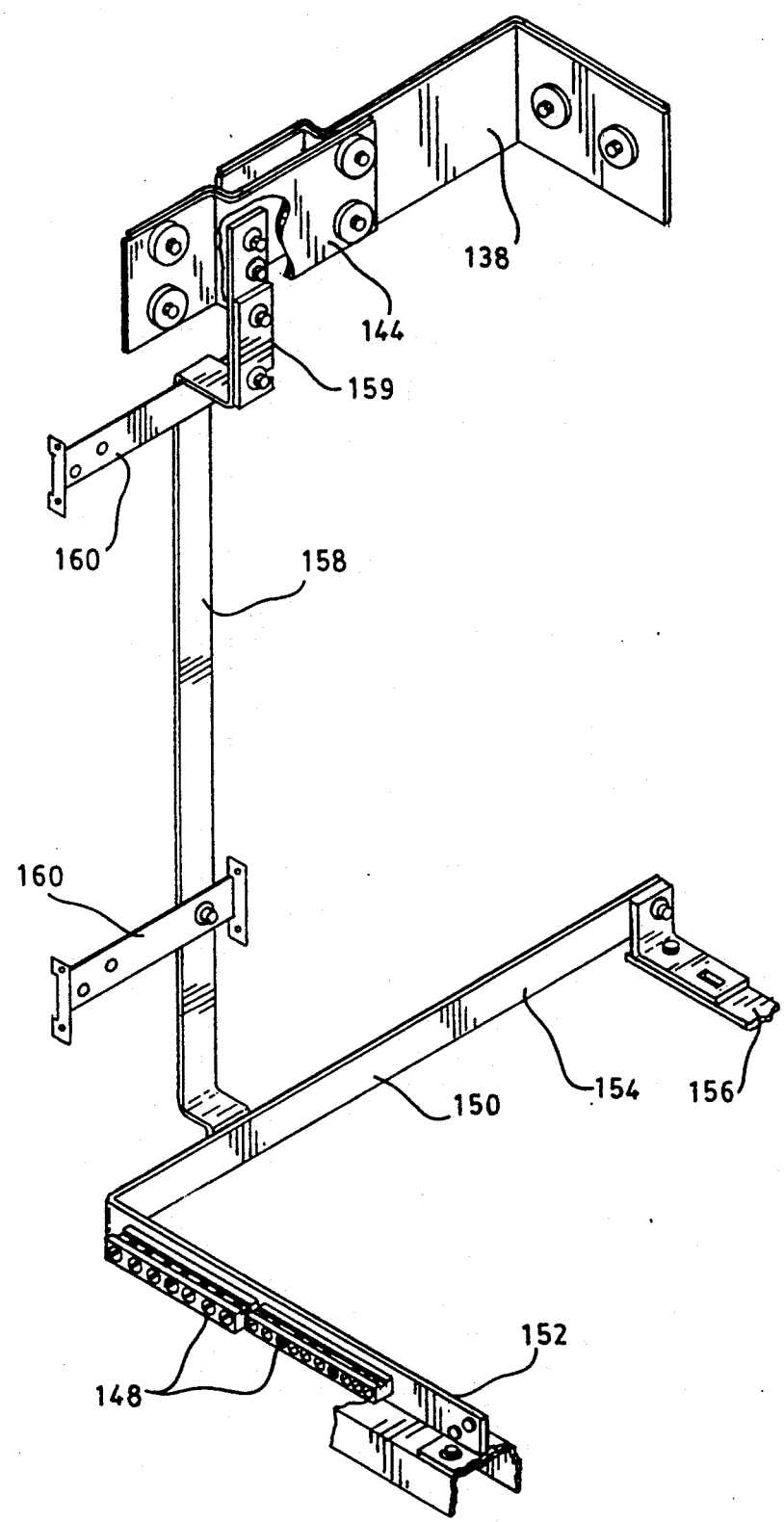
FIG. 18 illustrates a perspective view of the ground bus lug mounting assembly of the switchboard of the present invention.

As illustrated in FIG. 18, the switchboard 10 also features a ground bus lug mounting assembly 148 which is readily accessibly by removing the lower vented cover 32. (See FIGS. 1 and 2) The assembly 148 is mounted on a first leg 152 of an L-shaped ground bus connector 150, the first leg 152 being disposed proximate, and substantially parallel to the vented cover 32. The second leg 154 of the connector 150 extends rearwardly, and defines an outboard end portion which engages the ground bus member 156. Electrical connection with the neutral bus bar 142 is accomplished with a vertical ground bar 158 which is connected at its upper end to the neutral runback connecting member 138 with the main bonding jumper 159 and at its lower end to the ground bus connector 150. It will also be noted that the mounting brackets 160 can be provided for securing the vertical ground bar 158 in the first vertical support channel 18.

In light of the above it will be recognized that the present invention provides a switchboard having great advantages over the prior art. The construction of the power stack assembly 12 and the use of multiple mounting pans to mount the breakers and stack assembly facilitates removal of radiated heat from the breakers and power stack such that the power stack can be greater in length and can accommodate a greater number of, and larger, circuit breakers. Further, the neutral bus bar and ground bus lug assembly are selectively positioned for better and safer access, facilitating installation and removal of breakers and otherwise facilitating setup and maintenance of the switchboard.

However, while a preferred embodiment has been shown and described, it will be understood that there is no intent to limit the invention to such disclosure, but rather it is intended to cover all modifications and alternate constructions falling within the spirit and scope of the invention as defined in the appended claims.

I claim:

1. A switchboard for mounting and supplying electrical power to a plurality of circuit breakers, said switchboard comprising:
   a frame; and
   a power stack assembly mounted on said frame, said power stack assembly including a plurality of substantially vertically disposed, elongated main bus bar members connected to a source of electrical power and releasably engaging said circuit breakers, said main bus bar members being selectively spaced with elongated insulator means extending continuously along and between said bus bar members to form closed ventilation passageways such that said closed ventilation passageways between said bus bar members are defined by opposing faces of said main bus bar members and opposing faces of said insulator means, each said ventilation passageway defining an opening proximate a lower end of said power stack assembly and an opening proximate an upper end of said power stack assembly whereby convection air is allowed to rise within said ventilation passageways to cool said power stack assembly.

2. The switchboard of claim 1 wherein said main bus bar members are provided with a plurality of transverse ventilation openings to establish communication of said convection air flow between said ventilation passageways.

3. The switchboard of claim 1 wherein said frame includes a first mounting pan engaging and supporting said power stack assembly, said first mounting pan being selectively spaced from a first said main bus bar member with further insulator means such that a further ventilation passageway is defined between said first mounting pan and said first main bus bar member, said further ventilation passageway defining an opening proximate the lower end of said power stack assembly and an opening proximate the upper end of said power stack assembly whereby convection air is allowed to rise within said further ventilation passageway to cool said power stack assembly.

4. The switchboard of claim 3 wherein said main bus bar members are provided with a plurality of transverse ventilation openings to establish communication of said convection air flow between said ventilation passageways, and wherein said first mounting pan is provided with a plurality of ventilation openings for establishing communication of said convection air flow between said further ventilation passageway and said ventilation passageways defined between said main bus bar members.

5. The switchboard of claim 3 wherein said power stack assembly includes a channel vent cover selectively spaced from a further said main bus bar with insulator means such that an outer ventilation passageway is provided between said further main bus bar and said channel vent cover, said outer ventilation passageway defining an opening proximate the lower end of said power stack assembly and an opening proximate the upper end of said power stack assembly whereby convection air is allowed to rise within said outer ventilation passageway to cool said power stack assembly.

6. The switchboard of claim 1 wherein said frame includes a center mounting pan engaging and supporting said power stack assembly and at least a first circuit breaker mounting pan, selectively spaced from said center mounting pan, engaging and supporting a rear end portion of said circuit breakers so as to define an open area between said center mounting pan and said first circuit breaker mounting pan, whereby convection air flow is allowed to wash over the back surface of said circuit breakers and heat radiated by said back surfaces is allowed to transfer to rearward structures of said switchboard.

7. The switchboard of claim 6 wherein said frame includes at least one second circuit breaker mounting pan engaging and supporting said rear end portion of said circuit breakers selectively spaced from said center mounting pan and oppositely disposed from said first circuit breaker mounting pan relative to said center mounting pan so as to define an open area between said center mounting pan and said second circuit breaker mounting pan, whereby convection air flow is allowed to wash over back surfaces of said circuit breakers and heat radiated by said back surfaces is allowed to transfer to rearward structures of said switchboard.

8. The switchboard of claim 1 wherein said frame includes first and second front channel supports disposed at a front portion of said switchboard, and wherein said switchboard further comprises an elongated, substantially vertically disposed neutral bus bar secured to said first front channel support, whereby said neutral bus bar is displaced forward from said power stack assembly to facilitate access to said neutral bus bar.

9. A switchboard for mounting and supplying electrical power to a plurality of circuit breakers, said switchboard comprising:

a frame including a center mounting pan, and at least first and second circuit breaker mounting pans engaging and supporting the rear end portions of said circuit breakers, said first circuit breaker mounting pan being selectively spaced from said center mounting pan so as to define an open area therebetween, and said second circuit breaker mounting pan being oppositely disposed with respect to said first circuit breaker mounting pan relative to said center mounting pan and selectively spaced from said center mounting pan so as to define an open area therebetween; and a power stack assembly mounted on said center mounting pan of said frame, said power stack assembly including first, second and third, substantially vertically disposed, elongated main bus bar members connected to a source of electrical power and releasably engaging said circuit breakers, said first main bus bar member being selectively spaced from said center mounting pan with insulator means so as to define a first ventilation passageway therebetween extending substantially the length of said power stack assembly, said second main bus bar member being selectively spaced from said first main bus bar member with insulator means so as to define a second ventilation passageway therebetween extending substantially the length of said power stack assembly, said third main bus bar member being selectively spaced from said second main bus bar member with insulator means so as to define a third ventilation passageway therebetween extending substantially the length of said power stack assembly, said power stack assembly further including a channel vent cover selectively spaced from said third main bus member with insulating means so as to define a forth ventilation passageway therebetween, each said first, second and third ventilation passageways defining an opening at the lower end of said power stack assembly and an opening at the upper end of said power stack assembly, and said forth ventilation passageway defining an opening proximate the lower end of said channel vent cover and an opening proximate the upper end of said channel vent cover, whereby convection air is allowed to rise within said first, second, third and forth ventilation passageways to cool said power stack assembly.

10. The switchboard of claim 9 wherein said center mounting pan is provided with a plurality of ventilation holes therethrough disposed along its length communicating with said first ventilation passageway, and wherein said main bus bars are provided with a plurality of ventilation holes therethrough along their lengths for establishing air flow communication between said ventilation passageways of said power stack assembly.

11. The switchboard of claim 9 wherein said frame includes first and second front channel supports disposed at a front portion of said switchboard, and wherein said switchboard further comprises an elongated substantially vertically disposed neutral bus bar secured to said first front channel support, whereby said neutral bus bar is displaced forward from said power stack assembly for facilitating access to said neutral bus bar, said neutral bus bar being provided with a plurality of mounting holes along its length to facilitate the selective positioning of operatively associated electrical connections and components.

12. A switchboard for mounting and supplying electrical power to a plurality of circuit breakers, said switchboard comprising:

a frame including first and second vertical front support channels connected by a plurality of horizontally disposed mounting channels, and including a center mounting pan secured to said mounting channels, and at least first and second circuit breaker mounting pans mounted on said mounting channels engaging and supporting rear end portions of said circuit breakers, said first circuit breaker mounting pan being selectively spaced from said center mounting pan so as to define an open area therebetween, and said second circuit breaker mounting pan being oppositely disposed to said first circuit breaker mounting pan relative to said center mounting pan and selectively spaced from said center mounting pan so as to define an open area therebetween, said center mounting pan being provided with a plurality of ventilation openings along its length;

a power stack assembly mounted on said center mounting pan of said frame, said power stack assembly including first, second and third, substantially vertically disposed elongated main bus bar members connected to a source of electrical power and releasably engaging said circuit breakers, said first main bus bar member being selectively spaced from said center mounting pan with elongated insulator means so as to define a first ventilation passageway therebetween extending substantially the length of aid power stack assembly, said second main bus bar member being selectively spaced from said first main bus bar member with elongated insulator means so as to define a second ventilation passageway therebetween extending substantially the length of said power stack assembly, said third main bus bar member being selectively spaced from said second main bus bar member with elongated insulator means so as to define a third ventilation passageway therebetween extending substantially the length of said power stack assembly, said power stack assembly further including a channel vent cover selectively spaced from said third main bus bar member with insulating means so as to define a fourth ventilation passageway therebetween, each said first, second and third ventilation passageway defining an opening proximate a lower end of said power stack assembly and an opening proximate an upper end of said power stack assembly, and said fourth ventilation passageway defining an opening at a lower end of said channel vent cover and an opening at an upper end of said channel vent cover, whereby convection air is allowed to rise within said first, second, third and fourth ventilation passageways to cool said power stack assembly, said first, second and third main bus bar members each being provided with a plurality of ventilation openings for establishing air flow between said ventilation passageways; and an elongated, substantially vertically disposed neutral bus bar secured to said first front channel support, whereby said neutral bus bar is displaced forward from said power stack assembly to facilitate access to said neutral bus bar, said neutral bus bar being provided with a plurality of mounting holes along its length to facilitate selective positioning of operatively associated electrical connections and components.

13. The switchboard of claim 12 wherein said frame further includes a removable lower vented cover extending between the lower end portions of the first and second front support channels, and wherein said switchboard further comprises a ground bus assembly disposed proximate said lower vented cover so as to be readily accessible by removal of said lower vented cover.

14. The switchboard of claim 12 wherein said frame includes a substantially horizontally disposed bottom cover member, and a substantially vertically disposed power stack cover panel covering said power stack assembly, and wherein said channel vent cover defines a lower end portion provided with an outwardly extending flange extending beneath and supporting said bottom cover member, said bottom cover member having an upturned further flange engaging and abutting against said lower end portion of said channel vent cover, said power stack cover panel having a lower end portion defining a notch receiving said further flange of said bottom cover member and securing said further flange against said lower end portion of said channel vent cover.

15. The switchboard of claim 14 wherein said frame includes a substantially horizontally disposed top cover member, and wherein said channel vent cover defines a upper end portion provided with an outwardly extending flange extending over and supporting said top cover member, said top cover member having a down-turned further flange engaging and abutting against said upper end portion of said channel vend cover, said power stack cover panel having an upper end portion defining a notch receiving said further flange of said top cover member and securing said further flange against said upper end portion of said channel vent cover.

16. A switchboard for mounting and supplying electrical power to a plurality of circuit breakers, said switchboard comprising:

a frame including a center mounting pan and at least a first circuit breaker mounting pan selectively spaced from said center mounting pan, said center mounting pan and said circuit breaker mounting pan engaging and supporting rear end portions of said circuit breakers so as to define an open area between said center mounting pan and said first circuit breaker mounting pan whereby convection air flow is allowed to wash over back surfaces of said circuit breakers and heat radiated by said back surfaces is allowed to transfer to rearward structures of said switchboard; and a power stack assembly, having an upper end and a lower end, mounted on said frame, said power stack assembly including a plurality of substantially vertically disposed elongated main bus bar members connected to a source of electrical power and releasably engaging said circuit breakers, said main bus bar members being selectively spaced with insulator means therebetween such that ventilation passageways are defined between said main bus bar members, each said ventilation passageway defining an opening proximate said lower end of said power stack assembly and an opening proximate said upper end of said power stack assembly whereby convection air is allowed to rise within said ventilation passageways to cool said power stack assembly.

17. The switchboard of claim 16 wherein said frame further includes at least one second circuit breaker mounting pan engaging and supporting rear end portions of said circuit breakers selectively spaced from said center mounting pan and oppositely disposed from said first circuit breaker mounting pan relative to said center mounting pan so as to define an open area between said center mounting pan and said second circuit breaker mounting pan, whereby convection air flow is allowed to wash over back surfaces of said circuit breakers and heat radiated by said back surfaces is allowed to transfer to rearward structures of said switchboard.

18. The switchboard of claim 16 wherein said frame includes a front channel support disposed at a front portion of aid switchboard, and wherein said switchboard further comprises an elongated, substantially vertically disposed neutral bus bar member secured to said front channel support, whereby said neutral bus bar member is displaced forward from said power stack assembly to facilitate access to said neutral bus bar member.

* * * * *